United States Patent Office 2,959,784
Patented Nov. 8, 1960

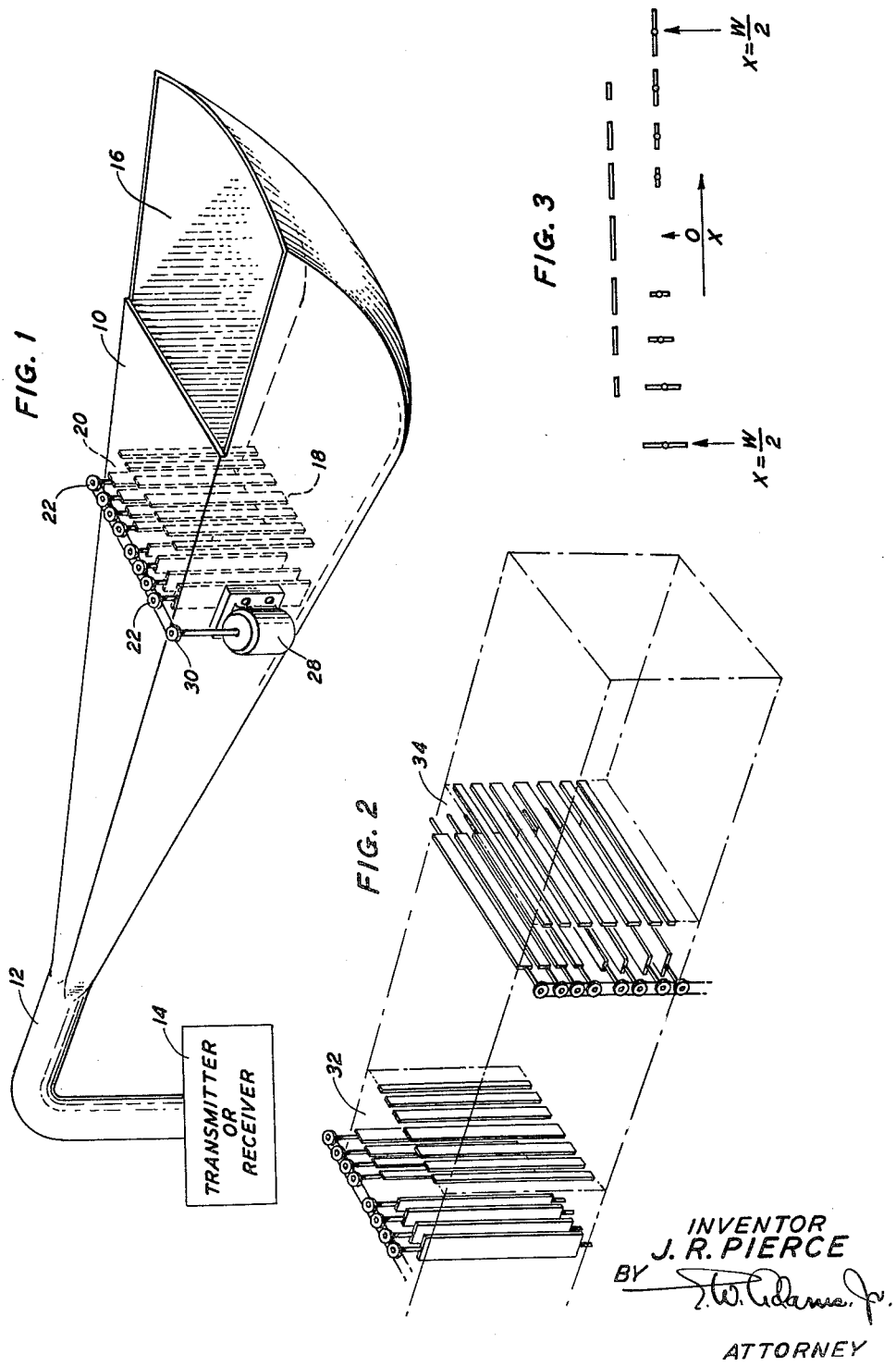

2,959,784

SCANNING ANTENNA SYSTEM

John R. Pierce, Berkeley Heights, N.J., assignor to Bell Telephone Laboratories, Incorporated, New York, N.Y., a corporation of New York Filed Aug. 14, 1959, Ser. No. 833,794

9 Claims. (Cl. 343—783)

This invention relates to antennas for microwave systems and more particularly to antennas for use in radio astronomy and similar applications requiring the tracking of moving objects.

Scanning antennas are employed for tracking moving objects and are of particular interest when automatic tracking of a moving object is required. Although many scanning and tracking antennas have been developed for use in radar and similar systems, the problems involved in tracking celestial bodies and other moving objects such as space satellites employed as radio repeaters, for example, require an antenna system which has a low effective noise temperature, high gain, and mechanical simplicity. The high gain requirement normally necessitates the use of an extremely large and bulky antenna system, while the low noise temperature requirement is best met, for example, by the so-called horn-reflector antenna. This antenna has a very low effective noise temperature but particularly in the sizes required to produce the requisite characteristics is rather bulky and does not lend itself well to mechanical scanning for tracking purposes.

It is the object of the present invention to simplify the construction of tracking antennas for microwave frequencies and particularly to provide for tracking or scanning operation of a horn-reflector antenna.

In accordance with the above object, the tracking antenna of the invention includes means for launching a plane-polarized wave having a particular plane of polarization and in a medium having a first propagation constant. Means are located in the path of these waves for varying the direction of propagation thereof and comprise at least an array of slat-like elements of material having a second propagation constant and mounted for rotation about their long axes which are arranged to be normal to one transverse field component of the plane-polarized waves. The slat-like elements are graduated in width over at least a part of the array and means are provided for rotating those elements of graduated width together about their respective long axes.

The above and other features of the invention will be described in the following specification taken in connection with the drawing in which:

Fig. 1 is a perspective view partly in section of an antenna according to the invention arranged to sweep the radiation pattern in one dimension;

Fig. 2 is a fragmentary perspective view showing a modification of the arrangement of Fig. 1 to permit sweeping of the radiation pattern in two dimensions; and Fig. 3 is a diagram illustrating the relationships between certain of the scanning elements shown in Figs. 1 and 2.

In the basic arrangement according to the invention a horn-reflector antenna 10 of the kind disclosed, for example, in Patents 2,416,675 to Beck et al., March 4, 1947, and 2,817,837 to Dale et al., December 24, 1957, is connected by a section of wave guide 12 capable of supporting a transmitter and/or receiver indicated at 14 arranged to utilize plane-polarized waves having a particular plane of polarization.

It is a characteristic of the horn-reflector antenna that it will transmit or receive plane-polarized waves having any particular plane of polarization and it is assumed for purposes of the present description that the waves under consideration are launched from a transmitter at 14 or reach a receiver at this point with the electric vector normal to the face of the antenna feed horn having the radiating aperture 16. The direction in which the axis of the radiation pattern of the antenna is oriented may be changed without moving the antenna by placing the equivalent of an optical prism with appropriate orientation in the path of the waves in the throat of the feed horn. The extent of the deflection so produced will depend upon the dimensions of the elements involved and upon the difference between the propagation constant of the medium in which the wave is originally traveling and that of the medium of which the "prism" is made. If the propagation constant of the latter medium is varied periodically, the beam (axis of the radiation pattern) may be caused to sweep back and forth in a corresponding fashion. It can be shown that in order to produce the effect of a variable prism to swing the electro-magnetic beam back and forth, the propagation constant, and for purposes of discussion this may be taken as the dielectric constant, should vary as $$ax \sin wt \qquad (1)$$

across the throat of the horn at the location of the prism, where $x$ is the distance from the center of the aperture, $a$ is the constant and $w$ is the radian frequency at which the beam is to be swept. Since a negative dielectric constant would be required to meet the limitations of Equation 1, it is convenient to modify the requirement as shown in the following equation:

$$ax \sin wt + W/2 \qquad (2)$$

where $W$ is one-half the transverse dimension of the aperture.

The requirement set by Equation 2 is met, according to the invention, by providing arrays of slat-like elements formed of material having a dielectric constant differing from that of the material which fills the remainder of the reflector horn, this latter material normally being air with a dielectric constant of 1. It can be shown that if a slat of such material is mounted for rotation about its long axis, and this long axis is so oriented in the throat of the horn as to be normal to the electric vector of the electromagnetic wave propagated therein, the variation of the dielectric constant with time as the slat is revolved may be written $$b(1+\sin 2pt) \qquad (3)$$

$b$ is a constant which increases with the width of the slat and $p$ is the angular velocity of rotation of the slat about its long axis.

It will be recognized that if an array of such slats is disposed across the aperture and if the quantity $b$ is chosen for each slat in an appropriate manner, portions of the electromagnetic wave front reaching the array will, when the slats are oriented broadside to the approaching wave front, experience greater or lesser dielectric effect, depending upon the width of the slats and will be correspondingly delayed in transit through the array. Such progressive delay will, as in the case of light traversing a prism, cause bending or deflection of the wave passing through the array. If the slats are rotated, the total dielectric effect, and thus the degree of bending of the beam, can be varied.

For the purposes of the present invention it is desired to provide for sweeping the beam back and forth beyond its center point and for this purpose the basic arrangement discussed above is modified, as shown in Figs. 1 and 3. In Fig. 3, the array of rotatable slats referred to above is replaced by a somewhat differently arranged array comprising two sets of slats disposed across the aperture of the reflector horn. If the point marked "O" in Fig. 3 is taken as the center of the aperture and the distances to the sides are taken as $$\frac{W}{2}$$

a plurality of slats tapering in width from O (the absence of a slat) at the center to a maximum at $$\frac{\pm W}{2}$$

is provided. As shown in Fig. 3, four slats are located each side of the center point for rotation about axes which are taken in Fig. 3 as extending normal to the plane of the paper. It will be noted that the portion of the array of slats at the right-hand side of the center point comprises four slats parallel to one another and presenting their broad faces to an incident electromagnetic wave which may be taken as traveling vertically from the bottom of the paper to the top of Fig. 3 with its electric vector horizontal (in the plane of the paper). The four slats forming the left-hand portion of the array are oriented parallel to one another but at an angle of 90 degrees to the slats in the right-hand portion.

It can be seen that in the arrangement shown in Fig. 3 and thus far described, the slats in the left-hand portion of the array, being normal to the electric vector, will have substantially no dielectric effect and will produce no substantial change in the propagation of oncoming electromagnetic waves. The slats on the right-hand portion, on the other hand, are parallel to the electric vector and will introduce a dielectric effect which will vary with the width of the slats and will be greatest at the extreme right-hand side of Fig. 3 and progressively less toward the center of the array.

In order to obtain the desired sweeping effect which permits deflection of the radiation pattern back and forth either side of the midpoint, a second array of slats of fixed orientation and having their long axes parallel and parallel to the axes of the rotatable slats previously discussed, is mounted on the opposite side of the rotatable slats from the reflector feedpoint. The fixed slats are mounted opposite the respective rotatable slats and tapered in width from zero at the extremes of the aperture to a maximum at the center thereof. If the fixed slats, which are oriented in such a way as to couple with and affect the electric vector, provide a dielectric constant $c$, and if each fixed slat at a position $x$ is taken to produce a dielectric constant according to Equation 1, then an overall effect which will meet the requirements of Equation 2 may be obtained if $b$ and $c$ are adjusted so that $$ax \sin wt + aW/2 = b(1 + \sin 2pt) + c \quad (4)$$

This is accomplished when $$p = w/2$$
$$b = ax$$
$$b + x = aW/2$$
$$c = a(W/2 - x) \quad (5)$$

As a result of the above, it is seen that the angular rotation of the movable slats should occur at angular frequency equal to one-half of the desired radian frequency of sweeping, the width of the slats $b$ should vary as a function of the distance of a particular slat from the center of the array, and the width of the fixed slats should vary as a function of the distance from the edges of the array.

The composite effect of the double array of slats may be determined from a consideration of the arrangement shown in Fig. 3. Here, the rotating slats on the left-hand side of the array produce no dielectric effect as set forth above. However, the dielectric effect produced by the fixed array of slats increases from zero at the left-hand end of the array to a maximum at the center of the array. Beyond the center of the array and progressing toward the right-hand side thereof the dielectric effect is produced by the sum of the effect of the fixed and rotatable slats. As shown in Fig. 3, this sum increases progressively from the center of the array to the right-hand side thereof, it being noted that the widths of the slats, both fixed and rotatable, are adjusted in accordance with Equation 5. It can be seen that the total dielectric effect of the double array increases progressively from the left-hand side to the right-hand side of the array. If, now, the slats of the movable array are rotatable together, preserving the phase or angular relationship shown in Fig. 3, the dielectric effect may be adjusted to produce a gradient of opposite sign across the aperture, this occurring when the slats on the left-hand side of the array are parallel to the fixed slats and those on the right-hand side of the array are normal thereto. It will be understood that as the slats of the movable array rotate, the gradient of dielectric effect may be caused to take any value of substantially constant slope across the aperture between the two limits.

The mechanical arrangement of the variable dielectric array discussed heretofore is shown schematically in Fig. 1. Here, the fixed array of slats 18 is mounted with the long axes of the slats normal to the face of the reflector horn in which the aperture is located and with the long axes of the slats normal to the electric vector. The slats of array 18 vary in width in the same way as those shown for the fixed array of Fig. 3. Mounted behind the fixed slats and nearer to the feedpoint of the antenna is an array 20 of rotatable slats corresponding to the rotatable slats of Fig. 3 both in width and in location relative to the fixed slats of array 18. The slats of array 20 are arranged for rotation about their respective long axes and for this purpose the axes are carried through the wall of the horn reflector and are provided with pulleys or wheels as at 22. The pulleys which drive the slats in each half of the array are respectively belted together so that the slats in each half of the array may be rotated in phase. In addition, the initial positions of the slats in the array are so chosen that the slats of one-half of the array may be rotated out of phase with those of the other half by an angle of 90 degrees. An electric motor 28, operating through a drive pulley 30, is belted to the slats of one-half of the array and serves to rotate the slats of the entire array at an angular frequency $p$ equal to one-half the desired radian frequency of sweeping, in accordance with the equations set forth above.

It will be recognized that the arrangements thus far described permit sweeping the radiation pattern from the horn reflector in one dimension. Should it be desired to provide for sweeping of the pattern back and forth in a direction normal to that in which sweeping is afforded by the array of slats just described, a second and similar array of fixed and rotatable slats may also be provided in the throat of the reflector horn. Such an arrangement is shown in Fig. 2 of the drawing in which the array of slats shown in Fig. 1, and having a variable dielectric effect, is indicated at 32, and the second array, which is disposed at an angle of 90 degrees with respect to the first array, is indicated at 34. It will be recognized that the second array of slats can have no material eiect on the electric vector of the electromagnetic wave which is swept by the slats of array 32 because all of the slats are so oriented as to be normal to the electric vector. However, and according to the invention, the slats of the second array 34 may be caused to act on the magnetic vector component of the electromagnetic wave and in a fashion similar to that of the array of slats 32 caused to sweep the beam back and forth in a direction normal to that in which the wave is swept by array 34.

To this end, the slats of the array 34 are made of a material which is magnetically permeable and are dimensioned in a manner corresponding in all respects to that in which the dielectric slats of array 32 are dimensioned. Thus, as the movable slats of array 34 are rotated, a change in permeability and a second change of propagation velocity of the wave front are produced across the aperture and provide a gradient extending from the top to the bottom of the horn feed rather than from side to side. It will be seen, therefore, that by appropriate correlation of the drives of the two arrays of rotatable slats, the radiation pattern of the horn reflector may be caused to sweep in a circle or in any other desired manner. Ordinarily and for purposes of simplifying the controls, the two arrays of rotatable slats may be provided with separate drive motors, although it may be desirable in some instances to drive all rotatable slats from a single motor to insure a fixed relationship between the effects produced by the two arrays.

What is claimed is:

1. In a scanning antenna for microwave energy, means for launching a plane-polarized electromagnetic wave having a particular polarization in a medium having a first propagation constant and means located in the path of the waves for varying the direction of propagation thereof comprising an array of slat-like elements of material having a second propagation constant mounted with their long axes normal to one transverse field component of said wave, said elements being graduated in width over at least a part of said array, and means for rotating said graduated-width elements together about their respective long axes.

2. In a scanning antenna, means for launching a plane-polarized electromagnetic wave with a particular plane of polarization and in a medium having a first propagation constant and means located in the path of said waves for varying the direction of propagation thereof comprising a first array of parallel slat-like elements of material having a second propagation constant mounted broadside to said waves with their long axes normal to one transverse field component of said waves, said elements being graduated in width from a maximum at the center of said array to a minima at the extremes of said array, a second set of elements of a material having a propagation constant differing from that of said medium mounted in an array parallel to said first array with the individual elements of the second set rotatable about axes parallel to the elements of said first array, the elements of said second set being graduated in width in opposite order with respect to those of said first array, and means for rotating at least some of the elements of said second array together about their axes of rotation.

3. In a scanning antenna for microwave energy, means for launching electromagnetic waves in a medium having a first propagation constant and means located in the path of said waves for variably modifying the propagation constant of said medium comprising a first array of slat-like elements mounted in fixed position with their axes normal to the electric vector of the waves to present their broad faces to incident waves, said elements being graduated in width from a greater width at the center of the array to minima at the edges thereof and a second set of elements mounted for rotation about axes respectively parallel to the axes of the first set, the widths of the elements of this second array being graduated in opposite order to those of the first, and means for rotating the elements of said second array, those elements in one-half of the second array rotating in phase and in quadrature with the elements of the second half of the array which are also rotated in phase.

4. In a scanning antenna, means for launching a plane-polarized electromagnetic wave with a particular plane of polarization and in a medium having a first propagation constant and means located in the path of said waves for varying the direction of propagation thereof comprising an array of slat-like elements of dielectric material having a dielectric constant differing from that of said first medium mounted with their long axes normal to the electric vector of said electromagnetic waves, said elements being graduated in width over at least a part of said array, and means for rotating said elements together about their respective long axes.

5. In a scanning antenna, means for launching a plane-polarized electromagnetic wave with a particular plane of polarization and in a medium having a first propagation constant and means located in the path of said waves for varying the direction of propagation thereof comprising an array of slat-like elements of magnetically permeable material having a dielectric constant differing from that of said first medium mounted with their long axes normal to the magnetic vector of said electromagnetic waves, said elements being graduated in width over at least a part of said array, and means for rotating said elements together about their respective long axes.

6. In a scanning antenna for microwave energy, means for launching electromagnetic waves in a medium having a first propagation constant and means located in the path of said waves for variably modifying the propagation constant of said medium comprising a first array of slat-like elements of magnetically permeable material mounted in fixed position with their long axes normal to the magnetic vector of said waves to present their broad faces to said waves, said elements being graduated in width from a greater width at the center of the array to minima at the edges thereof and a second set of elements of magnetically permeable material mounted for rotation about axes respectively parallel to the axes of said first set, the widths of the elements of said second array being graduated in opposite order to those of said first array, and means for rotating the elements of said second array, those elements in one-half of the second array rotating in phase and in quadrature with the elements of the second half of the array which are also rotated in phase.

7. In a scanning antenna, means for launching a plane-polarized electromagnetic wave with a particular plane of polarization and in a medium having a first propagation constant and means located in the path of said waves for varying the direction of propagation thereof comprising an array of slat-like elements of dielectric material having a dielectric constant differing from that of said first medium mounted with their long axes normal to the electric vector of said waves, said elements being graduated in width at least over a part of said array, means for rotating said graduated width elements together about their respective long axes, a second array of slat-like elements of magnetically permeable material mounted with their long axes normal to the magnetic vector of said waves, said elements being graduated in width and rotatable about their respective long axes in the same manner as the elements of said first array, and means for rotating said elements of said second array together about their respective long axes.

8. In a scanning antenna, means for launching a plane-polarized electromagnetic wave with a particular plane of polarization and in a medium having a first propagation constant and means located in the path of said waves for varying the direction of propagation thereof comprising an array of slat-like elements of dielectric material having a dielectric constant differing from that of said first medium mounted with their long axes normal to the electric vector of said waves, said elements being graduated in width at least over a part of said array, means for rotating said graduated-width elements together about their respective long axes, a second array of slat-like elements of magnetically permeable material mounted with their long axes normal to the magnetic vector of said waves, said elements being graduated in width and rotatable about their respective long axes in the same manner as the elements of said first array, means for rotating the elements of said first array about their long axes and the elements of said second array about their long axes in predetermined relationship to effect a desired scanning pattern for said antenna.

9. In a scanning antenna for microwave energy, means for launching electromagnetic waves in a medium having a first propagation constant and means located in the path of said waves for variably modifying the propagation constant of said medium comprising a first array of slat-like elements mounted in fixed position with their axes normal to the electric vector of the waves to present their broad faces to incident waves, said elements being graduated in width from a greater width at the center of the array to minima at the edges thereof and a second set of elements mounted for rotation about axes respectively parallel to the axes of the first set, the widths of the elements of this second array being graduated in opposite order to those of the first, second means located in the path of said waves for variably modifying the propagation constant of said medium comprising a second array of fixed slat-like elements and a second array of rotatable slat-like elements, all of the elements of said second fixed and said second rotatable arrays being formed of magnetically permeable material and being mounted with their long axes normal to the magnetic vector of said waves, and means for rotating the elements of said second rotatable array, those elements in one-half of the second rotatable array rotating in phase and in quadrature with the elements of the other half of said second rotatable array which are also rotatable in phase.

No references cited.